United States Patent Office 3,597,379
Patented Aug. 3, 1971

3,597,379
ADHESIVE COMPOSITION OF PHENOL-FORMAL-
DEHYDE RESIN AND RUBBER LATICES
Robert J. Van Valkenburg, Lincoln, Nebr., assignor to
The Goodyear Tire & Rubber Company, Akron, Ohio
No Drawing. Filed Apr. 15, 1968, Ser. No. 721,146
Int. Cl. C08g 5/06
U.S. Cl. 260—29.3    3 Claims

ABSTRACT OF THE DISCLOSURE

Rubber is reinforced with a cord bonded to the rubber with an adhesive containing a phenol/formaldehyde resin and certain rubber latices present in certain amounts to produce an all-purpose adhesive useful in a one-step bonding system.

---

This invention relates to an improved adhesive for bonding reinforcing cords to rubber and to a rubber article having a cord bonded therein by means of the adhesive and to the process of treating a reinforcing cord with the adhesive of this invention.

In the manufacture of such reinforced rubber articles as pneumatic tires, power-drive belts, conveyor belts, high-pressure hose and the like, the useful life of these articles depends to a great extent upon the bond secured between the reinforcing element or cord and the rubber. The chemistry and physical properties of the cord and the rubber being reinforced determines to a large extent the degree of adhesion and the life of the bond developed at the interface of these different materials.

Where rubber is being reinforced with a cord, a sharp difference exists in the modulus of the materials used. For example, the modulus at break for the rubber may range from about 500 p.s.i. to about 4,000 p.s.i., whereas the modulus at break for the reinforcing cord may range from about 50,000 p.s.i. to 500,000 p.s.i. This large difference between the moduli of these materials being bonded together develops severe shear forces at the interface when the structure is under stress.

In addition to the problem produced by shear forces, a wide variety of polymers are now used in making the cord and the rubber, each presenting a different surface to be bonded requiring specialized adhesive treatment to obtain optimum bonding. As a result of the many new cords developed to reinforce the many new rubbers, many new adhesives and systems have been devised to solve the specific adhesive problem at hand. An all-purpose cord to rubber adhesive useful in a one-step process would be economically beneficial if optimum bonding could be obtained in most instances.

It has now been discovered that an all-purpose adhesive useful in a one-step process for obtaining optimum bonding between a cord and a rubber can be made from a resorcinol/formaldehyde resin and a mixture of four different rubber latices present in certain amounts.

The adhesive composition of the present invention is useful in bonding many different cord materials to many different types of rubbers. Rubber material that may be effectively bonded to a cord include natural rubber as well as the varied butadiene-styrene synthetic rubbers containing 50 percent or more of bound butadiene-1,3 (SBR), the various polybutadienes (BR), the polyisoprenes (IR), and the other known suitable synthetic butadiene rubbers. Examples of other synthetic butadiene rubbers include chloroprene rubbers (C), acrylate-butadiene rubbers (ABR), isobutylene-isoprene rubbers (IIR), nitrile-butadiene rubbers (NBR), nitrile-chloroprene rubbers (NCR), pyridine-butadiene rubbers (PBR), styrene-chloroprene rubbers (SCR), ethylene propylene diene terpolymers (EPDM), and styrene-isoprene rubbers (SIR). The parenthetical abbreviations are in accordance with the ASTM designation: D1418–56T. The rubber material may also include mixtures of any of the above materials which each other or with reclaimed crude or synthetic rubber or other vulcanizable rubber materials. The rubber materials may also include any of the well-known compounding ingredients for rubber in the amounts and proportions in accordance with conventional compounding technique.

The filamentary or reinforcing material that may be bonded to the various rubbers noted above may be any of the naturally-occurring or synthetic filaments and may be in the form of yarn, cord or fabric. The filamentary material will include the naturally-occurring fibers such as cotton, silk, ramie, as well as the synthetic fiber-forming organic materials such as rayon, that is, the regenerated cellulosic materials whether prepared by the viscose, cuprammonium or other process; nylon, by which is meant synthetic linear superpolyamides such as polyhexamethylene adipamide, polycaproamides, polycaprolactams, polyacrylonitrile, polyaminotriazoles and other synthetic fibers made of polyesters including polyethylene terephthalate and polycarbonates, as well as cords made of glass fiber, metal coated glass fiber or metal coated nylon and brass coated steel wire. The reinforcing cords may be made in any conventional way using filaments of 900 to 1500 denier, and yarn of from 150 to 250 filaments, the yarn being twisted from 2½ turns to 13 turns per inch to form a cord and using 2 or more of the seconds twisted in reverse direction from 5 to 15 turns per inch to form a cable.

In order to more clearly illustrate the advantages and the scope of this invention, the following example sets forth the ingredients used in producing the improved cord-to-rubber adhesive of this invention, all parts being by dry weight per 100 parts of rubber latex solids unless otherwise indicated:

EXAMPLE 1

| Material | Parts (dry) | Range (for 1–4) |
|---|---|---|
| 1. Resorcinol | 10.93 | |
| 2. Distilled water (sufficient to make 20% solids) | | |
| 3. 37% formaldehyde | 5.23 | ±1.0 |
| 4. 10% sodium hydroxide (Aq sol) | 1.35 | ±.5 |

| | | Range (for 5–8) |
|---|---|---|
| 5. Rubber latex A (41.4% solids) | 50 | 45–55 |
| 6. Rubber latex B (41% solids) | 6 | 5–8 |
| 7. Rubber latex C (70% solids) | 24 | 20–30 |
| 8. Rubber latex D (63.5% solids) | 20 | 15–25 |

Rubber latex A is a vinylpyridine-diene-styrene terpolymer resulting from the reaction of a conjugated diene, a vinyl aromatic monomer, and a vinylpyridine in emulsion, using heat and a catalyst. The preferred diene monomer is 1,3-butadiene, the preferred vinyl aromatic monomer is styrene, and the preferred vinylpyridine monomer is 2-vinyl-pyridine. However, any 1,3-diene monomer may be used, including isoprene, 2,3-dimethyl-1,3-butadiene, 2-ethyl-1,3-butadiene, 1,3-dimethyl-1,3-butadiene, 1,3-pentadiene, 2,4-pentadiene, 3-methyl-2,4-pentadiene, 3,4-dimethyl-2,4-pentadiene, the straight chain, branched chain and cyclohexyl dienes, heptadienes and homologs, analogs or hydrocarbon substituted products.

Other vinylpyridines include 4-vinylpyridine and various aliphatic vinylpyridines, particularly the alkyl vinylpyridines such as 2-methyl-6-vinylpyridine, 2-vinyl-5-methylpyridine, 2-ethyl-5-vinylpyridine. Other vinyl aromatic monomers having the general formula

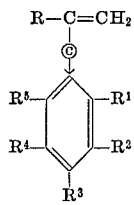

in which the R's may be hydrogen or alkyl radicals of 1 to 10C may be used, species being α-methyl styrene, p-methyl styrene and α-p-dimethyl styrene. These monomers may be copolymerized by any of the conventional methods well-known in the art, such as in bulk without solvents or diluents, in the presence of an inert solvent, or in emulsion. The proportions of the monomers initially present in the emulsion to be polymerized may range from 65 to 75 parts for butadiene-1,3, from 10 to 20 parts for styrene, and from 10 to 20 parts for 2-vinyl pyridine per 100 parts of monomers being polymerized. A preferred terpolymer is 70/15/15 butadiene-1,3/styrene/2-vinyl pyridine. A standard formulation for the preparation of a terpolymer of 1,3-butadiene, styrene and 2-vinylpyridine comprises the use of 180 parts of water per 100 parts of monomer, 5% of an emulsifier as, for example, sodium stearate, and 0.3% of a catalyst as, for example, potassium persulfate. In addition to this standard formulation, antioxidants and modifiers may be added. When the preferred terpolymer is made by the emulsion process, the resulting latex has a pH of about 11.0, a surface tension of about 48 dynes/cm., and an average particle size of about 800, a specific gravity of about 0.97 for the solids and a viscosity of about 27 cps.

Rubber latex B is an SBR latex which is made by a conventional low temperature process. The rubber latex B used in the adhesive of this invention is made by polymerizing at 41° F. an aqueous emulsion of the following formulation, all parts and percentages referred to herein being by weight:

| | Parts by weight |
|---|---|
| Butadiene-1,3 | 50.0 |
| Styrene | 50.0 |
| Disproportionated rosin soap (emulsifier) | 5.0 |
| Potassium hydroxide | 0.05 |
| Potassium chloride (viscosity reducer) | 0.2 |
| Tertiary alkyl (av. $C_{12}$) mercaptans, (regulator) | 0.2 |
| Cumene hydroperoxide (catalyst) | 0.1 |
| Water | 180.0 |

The reaction involving the above formulation is carried out by making a soap solution of a portion of the water, and a catalyst solution with the remainder of the water, and then mixing these two solutions at a reduced temperature of about 41° F. The regulator is then added to the styrene monomer, and this styrene mixture is then added to the soap solution containing the catalyst. Butadiene is charged to the reaction vessel and the total mixture agitated for the required period of time. When the reaction has gone to the desired conversion value, the short stop and antioxidant are added to the latex mixture. Generally the solids content of the latex ranges from 25 to 35%, depending upon the amount of water used and the percent conversion.

Any desirable emulsifying agent may be used, including potassium oleate or sodium rosinate. Any desirable additive or chain terminating agent may be used, including dodecyl mercaptan, and tertiary butyl mercaptan. Any of the usual polymerization catalysts operable in this reaction may be used, such as hydrogen peroxide, benzoyl peroxide, ammonium persulfate, potassium persulfate and sodium perborate. Any desirable short stop agent may be used, including di-ter butyl hydroquinone, dinitro chlorobenzene and sodium dimethyl dithiocarbamate. Any of the well-known antioxidants employed in the preservation of the rubber against oxidation may be used, including phenyl beta naphthylamine. The reaction generally takes from about 10 to about 20 hours, at the end of which time anywhere from 75 to 95% of the monomers being reacted are converted to polymers.

Butadiene-1,3 is the preferred diene hydrocarbon monomer to be used in making the rubbery copolymer of this invention. Butadiene may be used in amounts from about 40 to 95% and preferably from about 45% to 55%. However, other 1,3-diene hydrocarbon monomers may be used, including isoprene, 2,3-dimethyl-1,3-butadiene, 2-ethyl-1,3-butadiene, etc.

The most desirable results are obtained when using styrene as the vinyl aromatic monomer to be used in making the rubbery copolymer latex B. The rubber latex B used in this invention had a solids content of 41%, a pH of 11.0, a viscosity of 25 cps., a surface tension of 48 dynes/cm. and an average particle size of 1300 angstroms.

Rubber latex C is a large particle size SBR latex made in the following manner:

The reaction was conducted in a 20-gallon pressure vessel having an inside diameter of 18 inches and being 23 inches deep and equipped with 3 evenly spaced baffles, each 1½ inches wide and 14½ inches long and 3/16 inch thick, spaced ½ inch from the side of the reactor and equipped with two 8¼ inch diameter, flat blade turbine impellers having six evenly spaced 2-inch wide blades, one impeller spaced 1¾ inches from the bottom of the reactor and the other spaced 8¾ inches from the bottom of the reactor and rotated at 450 r.p.m. throughout the reaction. The following formula was charged to the reactor after the reactor was purged with butadiene vapors:

| Materials: | Parts |
|---|---|
| Water | 60 |
| Butadiene-1,3 | 70 |
| Styrene | 30 |
| Modifier (tertiary dodecyl mercaptan) | 0.1 |
| Tripotassium phosphate | 0.11 |
| Versene FE-3 | 0.005 |
| Ferrous sulfate heptahydrate | 0.005 |
| Sodium formaldehyde sulfoxylate | 0.027 |
| Diisopropyl benzene hydroperoxide (50%) | 0.045 |
| Sodium hydrosulfite | 0.016 |
| Potassium oleate | 1.23 |

Temperature 60° F.±10°.

At the end of the reaction time the latex contained 33.8% solids which was readily concentrated to a total solids content of 73% which had a Brookfield viscosity of 1500 cps., a final surface tension of 29 dynes per centimeter, and an estimated average particle size of 4,500 A. The Mooney plasticity (M/L–4) of the polymer was 150.5.

Large particle size SBR latex made in accordance with the disclosure of Canadian Pat. 720,461 using pressure to force the latex through a constriction may also be used.

Rubber latex D is an ester modified SBR latex wherein the formulation used in making rubber latex B is used to make rubber latex D with the exception that 5 parts of hydroxyethyl methacrylate was added to the monomer mixture of 55 parts of butadiene-1,3 and 40 parts of styrene. The resulting latex D had a total solids of 62%, a pH of about 8.0, and a Brookfield viscosity of 800 to 1500 cps.

The adhesive composition of this invention shown in Example 1 above is made by dissolving item 1 in item 2, then adding items 3 and 4 to the blend of 1 and 2. Latices A, B, C, and D above are pre-blended and then added to the blend of 1, 2, 3 and 4. The resulting adhesive dip is aged at room temperature for 16 hours before using.

The adhesive dip of Example 1 having a 20% solids content and a pH of 9.2 was applied to the rubber reinforcing tire cord fabric by passing the cord into the adhesive dip under a slight tension at the rate of 5 to 10 feet per minute at 70° F. and then dried under tension at 350° F. for 2 minutes followed by heat treatment at 425° F. for 40 seconds.

The treated cord is then embedded in a rubber stock compounded as follows:

Rubber stock

| Ingredients: | Parts (by weight) |
|---|---|
| Natural rubber | 100.00 |
| Zinc oxide | 3.00 |
| Carbon black | 29.80 |
| Stearic acid | 2.00 |
| Pine tar | 7.00 |
| Mercaptobenzothiazole | 1.25 |
| Sulfur | 3.00 |
| Diphenylguanidine | 0.15 |
| Phenyl beta naphthylamine | 1.00 |

Adhesion between the cord and rubber is measured on a ¼ inch U sample at 250° F. after a 15 minute cure of the rubber stock at 300° F. The ¼ inch U sample is made by embedding the cord in the form of a loop with the ends embedded in rubber stock ¼ inch wide, and then attempting to remove the cord from the rubber by pulling on the looped end of the cord, thereby attempting to remove two legs of the cord from the rubber.

The following data is obtained when using the cord indicated bonded to the rubber stock noted above:

| Example | Cord | Const. | Twist | U-Ad size, inch | Hot adhesion, 250° F., lbs. | |
|---|---|---|---|---|---|---|
| | | | | | Control [1] | Invention |
| 2 | T-68 dacron (polyester) | 1,300/3 | 10/10 | ¼ | 29.8 | 30.4 |
| 3 | 600 rayon (regenerated cellulose) | 1,650/2 | 12/12 | ¼ | 19.4 | 27.5 |
| 4 | 6 nylon (polyamide) | 840/2 | 12/12 | ¼ | 24.0 | 23.2 |

[1] Control adhesive same as invention but containing only rubber latices A and B.

It has been observed that maximum bonding is obtained with most materials when the quantity of resorcinol/formaldehyde resin and rubber latices are those set forth in Example 1 and when the latices are those described as being preferred. A small range of amounts of latices can be tolerated but only to the extent shown.

The adhesive composition of the present invention produces adequate bonding of reinforcing cords made of polyester, nylon, rayon, cotton, stainless steel and glass to pneumatic tire carcass rubber stocks. Thus, one all-purpose adhesive has been developed for the bonding of a variety of tire fabrics to various types of rubbers. The adhesive of this invention is also stable for long periods of time at normal plant storing conditions, and is useful as a single dip adhesive system without the use of complicated mixing techniques or expensive ingredients, resulting in the elimination of webbing problems and the substantial reduction of blow and blister problems in the manufacture of pneumatic tires.

While certain representative embodiments and details have been shown for the purpose of illustrating the invention, it will be apparent to those skilled in this art that various changes and modifications may be made therein without departing from the spirit or scope of the invention.

What is claimed is:

1. An aqueous adhesive composition the bond producing components of which consist essentially of a heat reactive phenol formaldehyde resin and 45 to 55 parts of a rubber latex terpolymer A of butadiene-1,3/styrene/2-vinyl pyridine 70/15/15; 5 to 8 parts of a rubber latex copolymer B of 45 to 55% butadiene-1,3/ and 55 to 45% of styrene; 20 to 30 parts of a rubber latex copolymer C of 70/30 butadiene-1,3/styrene of large particle size of an average of about 4,500 A. and 15 to 25 parts of a rubber latex terpolymer D of 5/55/40 hydroxyethyl methacrylate/butadiene-1,3/styrene, the parts of latices being per 100 parts of latices present and the resin being present in an amount from about 10 to 20 parts per 100 parts of rubber latices.

2. The adhesive composition of claim 1 wherein the resin is made from a mixture of 10.93 parts of resorcinol and 5.23 parts of formaldehyde.

3. The adhesive composition of claim 1 wherein the latices A, B, C and D are present in amounts of 50, 6, 24 and 20 parts respectively.

References Cited

UNITED STATES PATENTS

| 2,991,258 | 7/1961 | Haward et al. | 260—29.3 |
| 3,262,482 | 7/1966 | Clifton et al. | 260—29.3 |
| 3,300,426 | 1/1967 | Hunsucker | 260—29.3 |
| 3,424,608 | 1/1969 | Marzocchi et al. | 260—29.3 |

DONALD J. ARNOLD, Primary Examiner

U.S. Cl. X.R.

156—335; 161—253; 260—846

PO-1050
(5/69)

UNITED STATES PATENT OFFICE
CERTIFICATE OF CORRECTION

Patent No. 3,597,379      Dated August 3, 1971

Inventor(s) Robert J. Van Valkenburg

It is certified that error appears in the above-identified patent and that said Letters Patent are hereby corrected as shown below:

Column 2, line 6, "which" should read --with--.

Column 2, line 31, "the seconds" should read --these cords--.

Signed and sealed this 11th day of January 1972.

(SEAL)
Attest:

EDWARD M. FLETCHER, JR.
Attesting Officer

ROBERT GOTTSCHALK
Acting Commissioner of Patents